United States Patent

[11] 3,627,998

[72] Inventor Goran Anders Henrik Hemdal
Tyreso, Sweden
[21] Appl. No. 879,290
[22] Filed Nov. 24, 1969
[45] Patented Dec. 14, 1971
[73] Assignee Telefonaktiebolaget LM Ericsson
Stockholm, Sweden
[32] Priority Dec. 20, 1968
[33] Sweden
[31] 17,538/1968

[54] ARRANGEMENT FOR CONVERTING A BINARY NUMBER INTO A DECIMAL NUMBER IN A COMPUTER

1 Claim, 2 Drawing Figs.

[52] U.S. Cl. .......... 235/155, 340/347 DD
[51] Int. Cl. .......... G06f 5/02, H03k 13/24
[50] Field of Search .......... 235/155, 154; 340/347

[56] References Cited
UNITED STATES PATENTS

| | | | |
|---|---|---|---|
| 3,242,323 | 3/1966 | Marasco | 235/155 |
| 3,151,238 | 9/1964 | Symons | 235/155 |
| 3,082,950 | 3/1963 | Hogan | 235/155 |

*Primary Examiner*—Maynard R. Wilbur
*Assistant Examiner*—Michael K. Wolensky
*Attorney*—Hane & Baxley

ABSTRACT: A binary-to-decimal converter comprises a plurality of cascaded adding means having order numbers $n=1,2,3\ldots$ wherein the binary number is initially received by the adding means with order number 1 and proceeds serially through the adding means. The first adding means adding 1 to the binary number and each subsequent adding means multiplying the results from the previous adding means by $$(1+2^{2^{(n-1)}}).$$

Further means return the result from the last adding means to the input of the first adding means until such result is zero. For each such iteration certain bit positions of the result are stored, such bit positions representing the succession decimal digits of the conversion.

INVENTOR
GÖRAN ANDERS HENRIK HEMDAL

BY Hane and Baxley
ATTORNEYS

INVENTOR
GÖRAN ANDERS HENRIK HEMDAL

BY Hane and Baxley
ATTORNEYS

ARRANGEMENT FOR CONVERTING A BINARY NUMBER INTO A DECIMAL NUMBER IN A COMPUTER

This invention concerns an arrangement for converting a binary number into a decimal number in a computer, particularly a computer for process control, which possesses incomplete facilities for calculating operations such as multiplication and division.

When working with computers it is often necessary to be able to read rapidly a binary number in test en clair, i.e., to convert the binary number into a decimal number. A skilled computer operator has no difficulty in reading binary numbers consisting of a small number of bits whereas it takes a lot of time to translate long binary numbers. If it concerns a computer with complete facilities for the calculating operations, a conversion can be carried out by means of for example, a successive division by 10. A computer intended for process control has not, however, in most cases this possibility which implies that a division by ten has to be carried out by programming a number of subtractions and shifts which becomes relatively time consuming, at best in the order of a magnitude of one-fourth to one-half milliseconds.

According to the invention the division is replaced by an approximate multiplication which is carried out by means of the arrangement constituting the object of the invention and which is defined in the claim below.

Figure 1:
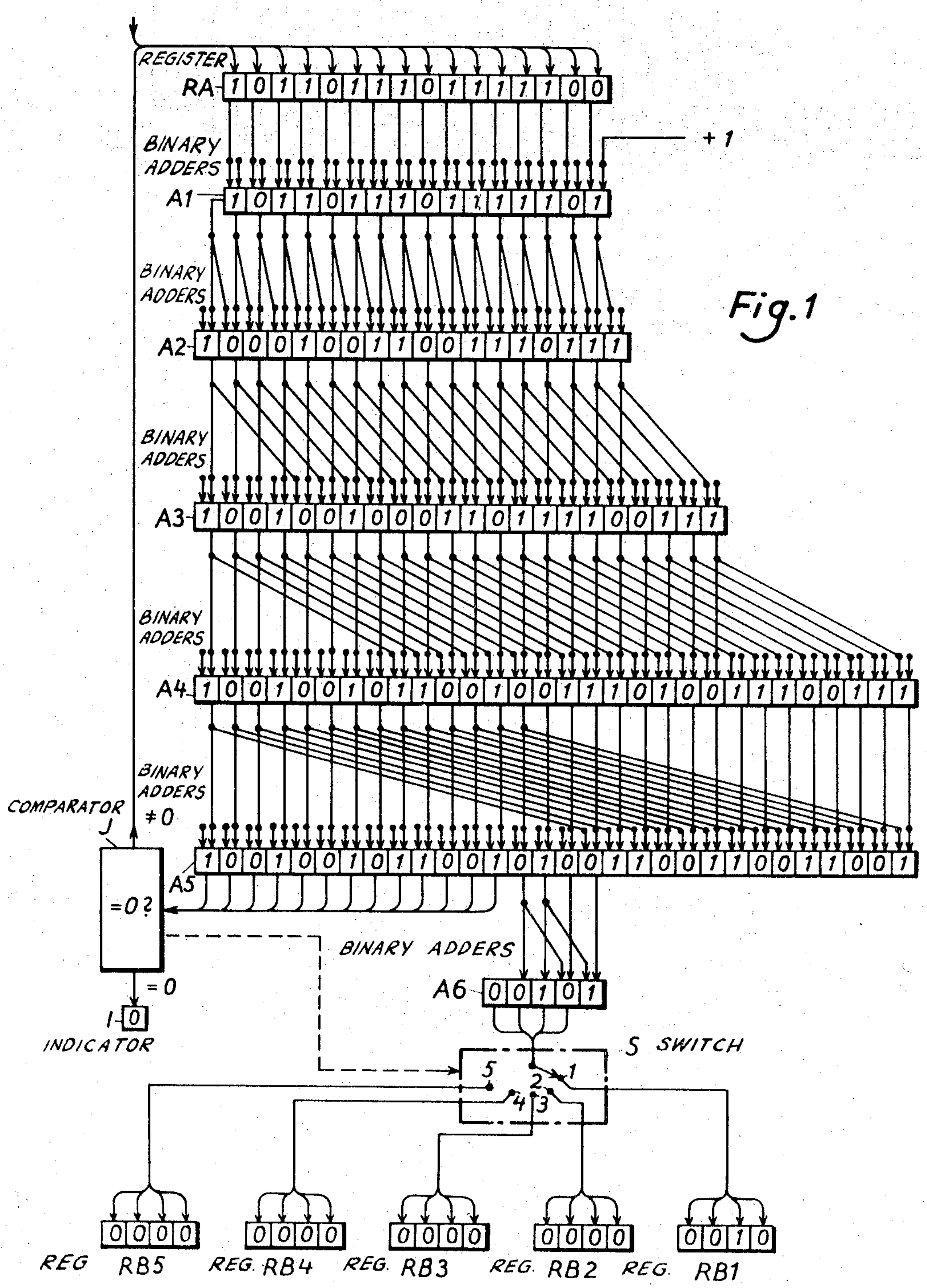
Figure 2:
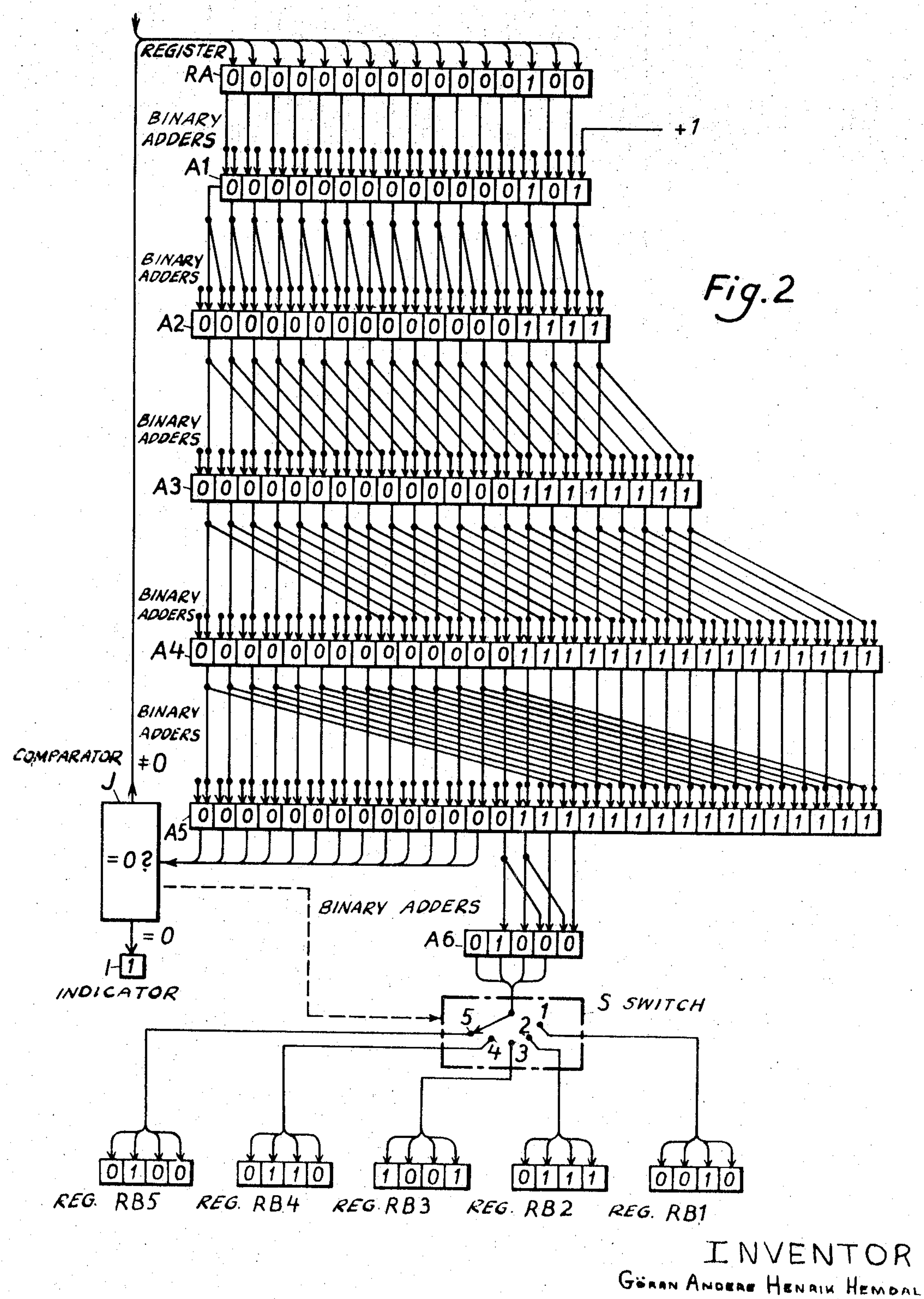

The invention is described in the following by means of an embodiment with reference to the accompanying drawing, in which the FIGS. 1 and 2 show diagrammatically the arrangement according to the invention. FIG. 1 shows the initial stage of the conversion of a binary number into a decimal number while FIG. 2 shows the concluding stage of the same conversion process.

A register in which the binary number that is to be converted is recorded, is indicated by RA. According to the embodiment the register has 16 bit positions which implies that a recording of binary numbers up to $2^{16}-1$ is rendered possible. If there is a need of being able to convert larger binary numbers, the number of bit positions must be increased correspondingly. A number of binary adding means built of binary adders are indicated by A1, A2, A3, A4 and A5 which adding means are cascade connected with each other in such a way that the result outlet from each adder of an adding means is connected to each one adding inlet of two separate adders in the following adding means. The adding means A1 has as many adders, i.e., 16, as the number of digit positions in the register RA; the adding means A2 has two adders more, whose purpose will be described below. Starting with the adding means with serial number $n=3$, the number of adders is increased by $2^{n-1}$ for each further adding means, i.e., the adding means A3 has four adders more than adding means A2, the adding means A4 has eight adders more than adding means A3, the adding means A5 should have had 16 further adders but according to the figure it has only the same number of adders as adding means A4, since said further adders are of no practical importance to the result of the conversion. The adding means require only a sufficient number of adders to insure that the four most significant decimals of the quotient are correct, as it will be explained below. The two above-mentioned different adders to which the same result outlet of an adder in the preceding adding means is connected, are located in the adding means A2 adjacent each other, in the following adding means at a distance of $2^{n-1}$, i.e., the distance of four adders from each other in the adding means A3, eight in A4 adding means and 16 in adding means A5.

In the adding means A1 one unit is added to the binary number that is to be converted, i.e., that number which is recorded in the register RA. The result from the adding means A1 is effectively multiplied in the adding means A2 by 3, and for each further adding means the result from the preceding adding means is multiplied by $(2^{2^{(n-1)}}+1)$, i.e., by $(2^4+1)$ in the adding means A3, by $(2^8+1)$ in the adding means A4 and by $(2^{16}+1)$ in the adding means A5.

If the number of digit positions of the register RA or the number of adders of the adding means A1 is indicated by $p$ there will be obtained from the result outlets of the $p-3$ most significant adders of the adding means A5 a binary number which is a 10th part of the original binary number, as it will be explained below. The result from said $p-3$ most significant adders in the adding means A5, thus according to the example 13, is fed in form of a binary number to the input of a comparator circuit J, while each of the four immediately succeeding adders has its result outlet connected separately to the four least significant adders of the adding means A6 comprising five adders, and one more inlet of the two least significant adders of the last-mentioned adding means has yet another inlet connected to the adders with serial number $p-2$ (=14) respectively $p-1$ (=15 in the adding means A5. By reference S a switch is indicated which has as many positions as the maximum number of digits that owing to the number of binary positions may be found in the searched decimal number, according to the example 5. The switch is in its initial position set to position 1 and is stepped forward to the other positions in proper order from the comparator circuit after each completed comparison. Five binary registers, each with four bit positions, are referenced RB1, RB2......RB5. In the comparator circuit J it is determined whether the earlier mentioned result of the adding means A5 is greater than zero and if so is the case the number is fed to the register RA and then the process is repeated by means of the cascade connected adding means and a new comparison takes place. As soon as the result is zero, deflection from an indicator I will be obtained.

As it is mentioned by way of introduction the conversion of a binary number into a decimal number is carried out in such a way that a successive division by 10 takes place. If, for example, the decimal number 34 567 is considered it is evident that a division by ten gives a quotient of 3456 and a remainder of 7. If then the quotient 3456 is divided by 10, a new quotient of 345 and a new remainder of 6 are obtained. Continuing in the same way, next time the quotient 34 and the remainder 5 will be obtained, then the quotient 3 and the remainder 4 and finally the quotient 0 and the remainder 3. The first obtained remainder 7 constitutes the last digit of the decimal number, 6 constitutes the last but one, etc., and the last-obtained remainder 3 constitutes its first digit. As it is mentioned earlier, a division in a computer which is not directly intended for division, is a relatively time-consuming process. If, instead of a series of divisions by 10, the computer is allowed to carry out a series of multiplications by a 10th part, the result can be achieved much more rapidly. Now, however, a 10th part expressed in binary form is a periodically uncompleted number of the form 0,00011001100110011001 1...... Thus it is necessary to form such a binary number which with a sufficiently good approximation contains the same sequence of ones and zeros as the above-mentioned binary decimals which however is not immediately possible without using certain artifices. By multiplying binary numbers selected in a suitable way, with each other a number of times, it is possible to achieve a good approximation to the periodicity of said periodical uncompleted number. It has been found that starting from the binary number 11 (decimal 3) a multiplication by the number 10001 (decimal 17) results in the number 110011 (decimal 51). By continuing the multiplication by the binary number 100000001 (decimal $2^8+1=257$) the result 1100110011 0011 is obtained which already is a relatively good approximation. After continued multiplying by 10000000000000001 (decimal $2^{16}+1$) one obtains 11001100110011001100110011 which is an adequate approximation to the periodicity in the expression indicating a 10th, where the placing of the decimal point has been left out of consideration. It is, however, easy to understand that it is possible to enlarge the series of ones and zeros as much as requested by a multiplication by $$(2^{(n-1)}+1),$$

where $n$=6,7,8.........

As was mentioned above an addition of 1 to that binary number which is to be converted is carried out in the adding means A1. This is a correction that is necessary as will be evident from the following table 1, where the numbers one to eleven are divided by 10:

TABLE 1

| Decimally | Binary | |
|---|---|---|
| 1/10=1.1/10 | 1. 0, 00011001100110011 . . . | =0, 0001100110 . . . |
| 2/10=2.1/10 | 10. 0, 00011001100110011 . . . | =0, 0011001100 . . . |
| 3/10=3.1/10 | 11. 0, 00011001100110011 . . . | =0, 0100110011 . . . |
| 4/10=4.1/10 | 100. 0, 00011001100110011 . . . | =0, 0110011001 . . . |
| 5/10=5.1/10 | 101. 0, 00011001100110011 . . . | =0, 0111111111 . . . |
| 6/10=6.1/10 | 110. 0, 00011001100110011 . . . | =0, 1001100110 . . . |
| 7/10=7.1/10 | 111. 0, 00011001100110011 . . . | =0, 1011001100 . . . |
| 8/10=8.1/10 | 1000. 0, 00011001100110011 . . . | =0, 1100110011 . . . |
| 9/10=9.1/10 | 1001. 0, 00011001100110011 . . . | =0, 1110011001 . . . |
| 10/10=10.1/10 | 1010. 0, 00011001100110011 . . . | =0, 1111111111 . . . |
| 11/10=11.1/10 | 1011. 0, 00011001100110011 . . . | =1, 0001100110 . . . |

As shown by the table the quotient becomes incorrect when the dividend is 10. The same is valid for all multiples by 10 since the binary decimals are the same for the same final digit in an arbitrary decimal number. This number is corrected by adding to the dividend before the division by 10, i.e., the multiplication by a 10th. At the same time the binary decimals represent the final result as it appears from the following. If the first four binary decimal positions are multiplied according to the above table by the binary number 101 (decimal 5) and the last three positions of the result are cancelled, the following result is obtained.

TABLE 2

| Division | First four binary decimals | Multiplication by five | Three last decimals cancelled |
|---|---|---|---|
| 1/10 | 0001 | 0000101 | 0000 0 |
| 2/10 | 0011 | 0001111 | 0001 1 |
| 3/10 | 0100 | 0010100 | 0010 2 |
| 4/10 | 0110 | 0011110 | 0011 3 |
| 5/10 | 0111 | 0100011 | 0100 4 |
| 6/10 | 1001 | 0101101 | 0101 5 |
| 7/10 | 1011 | 0110111 | 0110 6 |
| 8/10 | 1100 | 0111100 | 0111 7 |
| 9/10 | 1110 | 1000110 | 1000 8 |
| 10/10 | 1111 | 1001011 | 1001 9 |

As shown by the table, after multiplying the values of the second column by (binary) 101 and after cancelling the last three bit positions, the remainder values of the division of a decimal number corresponding to the original binary number will be obtained. These conditions have been considered in the arrangement according to the invention. Operation of the arrangement can now easily be explained by means of the figures of which FIG. 1 shows the initial stage of a conversion of the binary number 1011011101111100 which has been recorded in the register RA, into a decimal number. In the adding means A1 the number is increased by 1, in the adding means A2 a multiplication by 3 is carried out by means of a one-bit shift equivalent to a multiplication by decimal 2 and then addition of the number of the shifted value, in the adding means A3 a multiplication by $2^4+1$ is carried out by means of a four-bit position shift and then addition of the number of the shifted value, in the adding means A4 a multiplication by $2^8+1$ is carried out by means of an eight-bit position shift and addition, and in the adding means A5 a multiplication by $2^{16}+1$ is carried out by means of a 16-bit position shift and addition. The 13 most significant adders of the adding means A5 now contain the binary number 1001001011001 which is the quotient after the division by 10 , and the following four adders of the adding means contain the binary number 0100 which constitutes the four most significant decimals of the result, compare table 2. By means of a two-step shift and addition of the number of the shifted value, a multiplication by 5 takes place in the adding means A6. As shown by the figure the last three digit positions which would have been obtained in the result from the adding means A6 will disappear as was shown in connection with table 2. The first four adders of the adding means A6 now contain in binary form the remainder 0010 at the first division by 10. The switch S now is in position 1, and the information 0010 is fed to the register RB1. The quotient 1001001011001 is fed from the adding means to the comparator circuit J and since the quotient is not identical with 0 it will be transferred to the register RA. The same process is repeated a number of times, the remainder obtained by means of a successive stepping of the switch S being one after another recorded in the registers RB2, RB3 and RB4, respectively, while the quotients formed by each loop after comparison with 0 are transferred to the RA. It is now assumed (compare figure 2) that only one loop or iteration is left. In the register RA the number 0000000000000/00 is recorded. When this number has been operated on by the adding means A1–A5, the adding means A5 now contains exclusively zeros in its first 13 adders, i.e., the quotient is now 0 which is sown by the comparator circuit J and the indicator I indicates that the conversion has been completed. At the same time the four first decimals 0111 at the output of the 14th to the 17th adder in the adding means are multiplied by 5 and the first four bits of the result are fed via the switch S which now is in position 5, to the register RB5. The registers RB5–RB1 now indicate the result in binary-coded decimal representation. As it appears from FIG. 2, the following result is read: 0100, 0110, 1001, 0111, 0010, i.e., the number 46 972. The time taken up to convert the binary number 1011011101111100 into the decimal number 46 972 in form of binary-coded decimal representation will be considerably less than if the conversion would have taken place in the conventional manner by means of a program, namely in the order of 10 percent or less of the time needed for work with a program since each circuit adder carries out the work in approximately 0.5 $\mu$sec. while a program adder carries out the corresponding work in approximately 5 $\mu$sec.

What is claimed is:

1. Arrangement for producing a computer, particularly a computer for process control, a rapid conversion of a binary number into a decimal number, the arrangement in accordance with the requested accuracy of conversion comprising a number of adding means with serial numbers $n$=1,2,3 ....... and built up by binary adders which adding means are cascade connected with each other in such a way that the result outlet from each adder in an adding means is connected to each one adding inlet of two separate adders in the subsequent adding means, the fist adding means having at least as many adders as the number of digit positions $p$ in the binary number that is to be converted, the second adding means having two adders more than the first one, and from the adding means with serial number $n$=3 the number of adders is increasing by $2^{n-1}$ for each further adding means, said two separate adders to which the same result outlet of an adder in the preceding adding means is connected, being located in the adding means with serial number $n$ =2 beside each other, and in the following adding means at a $2^{n-1}$ adder's distance from each other, so that upon recording the binary number that is to be converted in the first adding means and upon addition of one unit in the other adding means the value of the original binary number increased by 1 is obtained multiplied by 3, and for each further adding means the result from the preceding adding means is obtained multiplied by $$(2^{(n-1)}+1),$$

a comparator circuit being arranged in order to compare the number represented by the result outlets of the most significant adders with serial number $p$–3 in the last adding means, and in case this number is larger than 0 to insert it in the first adding means, a further adding means with five adders so arranged that each one inlet of the four least significant adders is connected separately to the result outlets of the adders which Ser. Nos. $p-2$, $p-1$, $p$ and $p+1$, counted from the most significant adder in the last adding means and a further inlet of each of the two least significant adders is connected to the adders with Ser. Nos. $p-2$and $p-1$ respectively in said last adding means, a plurality of registers and a switch being arranged so that at each comparing operation by the comparator circuit the outlets of said further adding means are connected in proper order to different ones of said registers, whereby each of said registers stores a digit of the binary-coded decimal presentation of the result number.

* * * * *